United States Patent [19]

Gillman et al.

[11] 3,918,989

[45] Nov. 11, 1975

[54] FLEXIBLE ELECTRODE PLATE

[75] Inventors: Leland M. Gillman, Denver; Douglas W. Walker, Littleton, both of Colo.

[73] Assignee: The Gates Rubber Company, Denver, Colo.

[22] Filed: Aug. 1, 1974

[21] Appl. No.: 493,817

Related U.S. Application Data

[63] Continuation of Ser. No. 107,424, Jan. 18, 1971, abandoned.

[52] U.S. Cl. ............... 136/24; 136/25; 136/26; 136/27; 136/30; 136/31
[51] Int. Cl.² ........................................ H01M 43/04
[58] Field of Search ........... 136/127, 20, 23, 24, 30, 136/120, 122, 126

[56] References Cited
UNITED STATES PATENTS

| | | | |
|---|---|---|---|
| 2,708,683 | 5/1955 | Eisen | 136/20 X |
| 3,003,015 | 10/1961 | Duddy | 136/30 |
| 3,060,254 | 10/1962 | Urry | 136/30 X |
| 3,120,457 | 2/1964 | Duddy | 136/30 |
| 3,121,029 | 2/1964 | Duddy | 136/120 R X |
| 3,423,246 | 1/1969 | Prager et al. | 136/120 FC |
| 3,442,715 | 5/1969 | Yee et al. | 136/120 FC X |
| 3,558,356 | 1/1971 | Jost | 136/30 X |

*Primary Examiner*—John H. Mack
*Assistant Examiner*—C. F. LeFevour
*Attorney, Agent, or Firm*—Curtis H. Castleman, Jr.; Raymond Fink; H. W. Oberg, Jr.

[57] ABSTRACT

A pasted flexible electrode plate is described comprised of metallic conductive substrate upon which is attached an electrochemically active material in conjunction with a binder/plasticizer additive which imparts flexibility to the dry finished electrode plate. These electrode plates find use in a multitude of alkaline galvanic cells in which a cohesive, flexible electrode is required.

10 Claims, No Drawings

FLEXIBLE ELECTRODE PLATE

This is a continuation of application Ser. No. 107,424 filed Jan. 18, 1971, now abandoned.

BACKGROUND OF THE INVENTION

This invention relates to non-self-supporting electrode structures for use in galvanic cells. More particularly, the invention pertains to flexible electrodes which are capable of being wound in a jelly-roll configuration to be used in alkaline cells.

In preparing pasted electrode plates for alkaline batteries, it has been the common practice to use a water-soluble resin as an adhesive for the electrochemically active material. We have found that the resulting electrode plate is relatively inflexible and cracks unevenly when it is formed into a spiralwound cell pack or other configuration in which the electrode plate is made to bend. This effect is especially evident when the thickness of the pasted electrode plate is much greater than the substrate on which the paste is applied. This phenomenon of cracking presents a number of drawbacks, including loss of active material from the electrode by dusting and difficulty in handling and assembly. These problems are particularly acute in secondary cells in which there is a necessity for surface uniformity.

The most pertinent prior art may be found in the United States Patent Office Classification Class 136, Batteries. Examples of the state of the art include United States Pat. Nos. 2,738,375; 2,880,258; 2,931,846; 3,493,434; and Canadian Pat. No. 841,187.

It is a principle object of the present invention to produce a flexible electrode plate for use in alkaline galvanic cells.

It is another object of this invention to impart flexibility to an electrode plate yet maintain good discharge capacity and cohesiveness of the plate composition by use of a novel binder/plasticizer additive.

It is another object of this invention to produce a flexible electrode plate which lacks cracks which penetrate deeply into the plate structure.

It is a further object to produce a flexible pasted plate which will accommodate a thicker pasted layer than heretofore allowable.

It is still another object to provide a novel drying method to allow closely controlled shallow cracking of the electrode plate, providing greatly improved adhesion of the cracked portions to the substrate of the electrode plate.

These and other objects are met and the disadvantages of the prior art are solved by employing the electrode plate and its method of preparation according to the present invention as described herein.

SUMMARY OF THE INVENTION

Briefly described, the invention comprises a two component additive consisting of a water-soluble resin and a compatible plasticizer to be incorporated in an electrode paste formulation. The additive is mixed intimately with the electrochemically active material required for the electrode plate, and applied to a flexible electrically conductive substrate material to which the paste mixture becomes securely bonded. The resulting electrode plate is preferably dried under controlled humidity conditions, thus imparting required flexibility to the electrode plate.

The electrode plate of the present invention has particular utility in alkaline galvanic cells in which the electrode plate takes on a bent configuration although useful in parallel stacked plate arrangements as well. The electrode plate of the present invention may be spirally wound on a suitable mandrel to produce the so-called jelly-roll plate and separator configuration.

PREFERRED EMBODIMENTS OF THE INVENTION

1. General

The paste additive according to the present invention may be employed in conjunction with a number of paste formulations containing as the electrochemically active material such materials as mercuric oxide, manganese dioxide, zinc, cadmium, iron, indium, magnesium, aluminum and lead. This active material of the electrode should be compatible with both the binder and the plasticizer, hereinafter more particularly described. Thus, some of the more electropositive active materials, e.g. nickel, which would tend to oxidize either the binder or plasticizer would not be within the scope of the invention.

The electrically conductive substrate upon which the paste is applied may typically be a sheet or flat-grid structure such as woven wire screen, metal coated plastic, perforated sheet metal, et cetera, or expanded mesh. The substrate should provide a long-lasting base onto which the active material remains firmly in electrical contact, electrochemically active and reversible throughout the life of the galvanic cell.

The electrode plate of the present invention is adapted to be used in the presence of an alkaline electrolyte environment, preferably, although certain other electrolyte systems which are compatible with the constituents of the electrode plate would be operable. The preferred alkaline electrolyte provides a source of hydroxyl ions which enter into the electrochemical reaction of the plate. Examples of preferred electrolytes include alkaline earth metal hydroxides such as calcium hydroxide and strontium hydroxide and alkali metal hydroxides, exemplified by sodium hydroxide, potassium hydroxide, lithium hydroxide, rubidium hydroxide and cesium hydroxide. Ammonium hydroxide may be employed. Compatible mixtures of the preceeding may be utilized. The finished electrode plate contains pores and interstices which are of a composition wettable by the electrolyte.

2. Binder

The binders of the present invention are preferably water-soluble resins which tend to bind the active material of the electrode into a cohesive structure, and are compatible with the electrolyte, i.e. substantially non-reacting. The more preferred resins are composed of molecules containing OH or NH groups and which may have intermolecular and sometimes intramolecular hydrogen bonding. Closely spaced hydrogen bonds along the polymer chain are less preferred than widely spaced bonds since they will oppose plasticizer penetration. Since most alkaline cells contain oxygen, the binders should be substantially resistant to oxidation. The most preferred binders include relatively high molecular weight polymers with hydrophilic groupings.

While a large variety of materials will satisfy the above requirements for the binder, examples of suitable materials include cellulose derivatives having various degrees of substitution such as cellulose esters, exemplified by cellulose acetate; mixed cellulose esters exemplified by cellulose acetate propionate; carboxy methyl cellulose and its salts, preferably its alkali metal salts; cellulose ethers exemplified by lower alkyl ethers, including methyl and ethyl and carbocyclic including benzyl ethers; other cellulose non-ionic and anionic cellulose compounds exemplified by hydroxypropyl methyl cellulose; starch and its derivatives exemplified by Dextrin, starch acetates, starch hydroxyethyl ethers, and ionic starches where carboxyl, sulfonate or sulfate groups are introduced into the molecule; alkali and ammonia salts of alginic acid and derivatives exemplified by phycocolloids, sodium alginate and agar; natural gums exemplified by gum arabic, locust bean gum and guar gum; gelatin; animal glue; casein; synthetic resins including polyvinyl alcohol, polyvinyl butyral and polyvinyl formal; polyvinyl pyrrolidone; polyvinyl alkyl ethers exemplified by polyvinyl methyl ether; polyacrylic acids and their salts, exemplified by methacrylic acid; polyacrylamides including polymethylolacrylamide, and acrylamidedimethylaminopropyl acrylamide copolymer; and such diverse compounds as silk fibroin, rubber latex resin, ammonium lignosulfonate containing wood sugars, hydrated Fullers earth, ovalbumin, and the like. Compatible miscellaneous derivatives of the abovementioned compounds may also be used. Among useful derivatives include alkyl, carboxymethyl, cyanoethyl, aminoethyl, amidoethyl, quaternary ammonium alkyl, hydroxy alkyl ethers, as well as sulfate, phosphate, acrylic benzoic acid and benzoate esters.

Compatible copolymers or mixtures of the abovementioned binders may also be employed, e.g. starch or sodium alginate and polyvinyl alcohol. Particularly preferred materials as binders include polyvinyl alcohol, polyacrylamides and cellulose materials such as hydroxypropyl-methyl cellulose, methyl cellulose and the like. Partially hydrolyzed grades may be employed. These compounds have particularly good adhesion in potassium hydroxide, exhibiting minimum dustiness, and impart good flexibility to the finished electrode plate.

3. Plasticizer

A wide variety of plasticizers may be employed in conjunction with the binders of the present invention as an additive to the electrode paste mixture. The plasticizer should be compatible with the particular binder system in which it is to be co-joined. Thus, in general the preferred plasticizers will be water-soluble, hydrophilic and compatible with the electrolyte in the cell and resistant to oxidation. The best plasticizer for any particular binder generally will be found by experimentation, although in general, good compatibility is provided by similarity in chemical structure (polarity, shape, size).

While the preferred plasticizers of the present invention are primarily hydrophilic to facilitate blendability with the components of the electrode paste, in some instances plasticizers having both hydrophilic and oleophilic substituents may be employed. Thus, if the plasticizer has oleophilic character, it may be desirable to incorporate a small amount of a dispersent, wetting agent or surfactant for miscibilization. As examples, suitable surface-active substances include the non-ionic (e.g. polyethylene oxides), anionic (e.g. sodium lauryl sulfate), and cationic (e.g. cetyl pyridinium chloride) surfactants. Petroleum derived surfactants, such as the petroleum sulfonates, may also be suitably employed.

Suitable plasticizers according to the present invention include phthalates, exemplified by dimethyl phthalate, dibutyl phthalate, didecyl phthalate, di (methoxyethyl) phthalate, dicyclohexyl phthalate and ethyl phthalyl ethyl glycolate; adipates exemplified by dioctyl adipate, and benzyl octyl adipate; sebacates exemplified by dibutyl sebacate, and di (2-ethylhexyl) sebacate; phosphates exemplified by trichlorethyl phosphate, triphenyl phosphate, and 2-ethylhexyl diphenyl phosphate; citrates exemplified by triethyl citrate and acetyl tributyl citrate. Various other plasticizers may be employed, including butyl stearate, methyl acetyl ricinoleate, benzenesulfonic acid butylamide, di (2-ethylhexyl) thiodibutyrate (2-ethylhexyl)-p-hydroxybenzoate, glyceryl triacetate, glycerine and polyalkylene polyols such as polyethylene glycol.

Of course, the plasticizer should be chosen to be compatible with the particular binder used. For three of the preferred binders, the plasticizers shown in Table I are employed.

TABLE I

| Polyvinyl alcohol | Polyacrylamide | Cellulose Derivatives |
|---|---|---|
| High boiling point, water-soluble organic compounds containing hydroxyl, amide, or amino groups exemplified by lower molecular weight glycols such as ethylene glycol, triethylene glycol and polyethylene glycols having an average molecular weight of from about 4,000 to about 20,000 ethanol acetamide, ethanol formamide, ethanol amine salts such as acetate and the hydrochloride of triethanol amine, and sodium and ammonium thiocynates, and the like. | Polypropylene glycol, tridecyl alcohol-ethylene oxide adduct, sorbitin monooleate-ethylene oxide adduct, and the like. | Polyethylene glycol, polypropylene glycol, low molecular weight acetate polymers of vinyl acetate, ployallyl acetate, copolymers of ethylene and vinyl acetate with molecular weights of about 350 to 1,200, polyacrylates of higher alcohols (for cellulose nitrates), polyethylhexyl acrylate, 1,5-pentanediol, esters of polyglycols such as polyethylene glycol dilaurate with a moleuclar weight of at least about 900, glycerol sebacate, condensation products of propylone glycol and adipic and sebacic acid, and the like |

These particular lists are merely examples of useful plasticizers. The present invention is not to be limited thereby.

4. Examples

As a non-limiting illustration of a preferred electrode paste mixture, the following formulation is utilized for a zinc-containing flexible electrode plate, adapted to be spirally wound on a suitable mandrel. A preferred paste formulation consists of preferably from about 25 to about 99 and more preferably from about 35 to about 85 weight percent of relatively pure zinc powder, and about 15 weight percent or less of mercuric oxide, from about 10 to about 60 weight percent zinc oxide, and an aqueous solution of binder and plasticizer. The metallic zinc which accounts for the majority of the paste mixture may be provided in any desired form, although relatively pure zinc in the form of a powder is preferred. Alternatively zinc may be provided by cathodically reducing zinc oxide to sponge zinc, which gives a very porous mass. The mercuric compound is present to reduce corrosion coupling with zinc by raising the hydrogen over-voltage. This compound may be a reducible compound of mercury such as mercuric oxide or a functionally equivalent compound. It is also desirable to use an excess of a reducible zinc-active material, e.g. zinc oxide, with respect to the amount of oxidizable material present, to minimize hydrogen evolution from the zinc plate and possible cell rupture during charge and overcharge.

Preferably from about 0.05 to about 10 and more preferably from about 0.1 to about 5 weight percent of the dry, finished paste formulation is composed of the water-soluble resin binder defined hereinabove. In general, enough binder solution should be employed to blend the components into a smooth paste and impart adherence of the active material to the substrate although dryer or wetter consistencies may be employed. The paste is preferably formulated by preparing an aqueous solution (e.g. from about 0.1 to about 35 weight percent binder). To this solution is added the plasticizer, in an amount preferably from at least about 1 weight percent and more preferably in the range from about 5 to about 50 weight percent based on the binder utilized. This binder/plasticizer solution is then added to the dry metal powder mix and the paste is spread evenly on a cleaned substrate. The paste may be applied to the substrate in any convenient manner.

It has been found the flexibility of the resultant pasted plate is vastly improved by the controlled drying of the plate in an atmosphere in which the humidity is preferably maintained in the range of from about 30 to about 70 percent, more preferably from about 40 to about 60 percent at temperatures in the range of about 50°–90°F. After drying, the electrode plate according to the present invention readily bends and is spirally wound on a ¼ inch mandrel. No dusting is evident; a number of evenly spaced very shallow cracks extending parallel to the axis of the bend are sometimes present but present no drawbacks in the operation of the cell.

A number of plates in the following examples are prepared in the manner described above. These are tested for the properties of flexibility, adhesion in KOH, and dustiness when binders, plasticizers, or mixtures thereof are incorporated into the plates. The percents are based on the finished dry paste formulation unless otherwise noted.

EXAMPLE I

Plate A is prepared solely with a binder consisting of a 50 weight percent water solution of 20,000 average molecular weight polyethylene glycol (when used in lower concentrations this polymer exhibits plasticizer properties while at high concentrations, it behaves more like a binder). This plate is dried under the controlled conditions mentioned previously. While the dry plate is not dusty (i.e. particles do not rub off the plate onto the fingers under moderate pressure) and when immersed in a 35% solution of KOH, the paste exhibits good adhesion to the substrate; the plate thus prepared exhibits poor flexibility (i.e. the plate does not bend easily around a ¼ inch mandrel). The cracks induced in the plate are deep and the paste is so hard that when the plate is bent it tends to sever the expanded metal substrate.

EXAMPLE II

Plate B is prepared solely with a plasticizer consisting of a 2 percent by weight aqueous solution of 20,000 average molecular weight polyethylene glycol. This plate is dried under the controlled conditions mentioned previously. The dry plate is dusty and exhibits only fair flexibility, and it demonstrates poor adhesion in concentrated KOH.

EXAMPLE III

Plate C is prepared with a binder consisting of 2.6 percent by weight methyl cellulose. The plate is dried under the controlled conditions mentioned previously. The dry plate is not dusty, exhibits excellent adhesion in KOH, but has only fair flexibility, i.e. when the plate is wound around a ¼ inch mandrel, resultant cracks are induced which are uneven and cause portions of the active material to slough off.

EXAMPLE IV

Plate D is prepared with a binder consisting of 3 percent by weight methyl cellulose and 33 percent by weight (based on the binder) of polyethylene glycol of 20,000 average molecular weight as a plasticizer according to the present invention. This plate is dried at 50 percent relative humidity and 71°F. for about twenty hours. When examined, this plate lacks dustiness and demonstrates excellent flexibility and adhesion in KOH.

As additional illustrative embodiments, a variety of plasticizers are employed with the methyl cellulose binder.

EXAMPLE V

Plate E is prepared with a binder consisting of 2.5 percent by weight methyl cellulose and 40 percent by weight (based on the binder) of low molecular weight polyvinyl acetate as a plasticizer. This plate is dried at 45% relative humidity and 72°F. for about eighteen hours. When examined, this plate lacks dustiness and demonstrates excellent adhesion in KOH, and very good flexibility.

EXAMPLE VI

Plate F is prepared with a binder consisting of 2.5 percent by weight methyl cellulose and 40 percent by weight (based on the binder) of glycerol sebacate as a plasticizer. This plate is dried at 45% relative humidity and 72°F. for about 18 hours. When examined, this plate lacks dustiness and demonstrates excellent flexibility and adhesion in KOH.

Other highly acceptable binder-plasticizer combinations are prepared for further illustrative embodiments.

EXAMPLE VII

Plate G is prepared with a binder consisting of 5 percent by weight polyvinyl alcohol and 80 percent by weight (based on the binder) of polyethylene glycol of 20,000 average molecular weight as a plasticizer. This plate is dried at about 53% relative humidity and 70°F. for about eighteen hours. When examined, this plate lacks dustiness and demonstrates excellent adhesion in KOH and very good flexibility.

EXAMPLE VIII

Plate H is prepared with a binder consisting of 3 percent by weight polyacrylamide and 67 percent by weight (based on the binder) of polypropylene glycol as a plasticizer. This plate is dried at about 53% relative humidity and 70°F. for about eighteen hours. When examined, this plate lacks dustiness and demonstrates excellent flexibility and adhesion in KOH.

5. Modifications of the Invention

It should be understood that the invention is capable of a variety of modifications and variations which will be made apparent to those skilled in the art by a reading of the specification and which are to be included within the sphere of the claims appended hereto. One such modification would be to employ polymer stabilizers or modifiers in the paste formulation. Other materials such as extenders and expanders could also be employed without departing from the spirit of the invention.

What is claimed is:

1. A method for preparing a pasted flexible electrode plate consisting essentially of the steps of:
   a. formulating an aqueous paste mixture comprising (1) electrochemically active material selected from the group consisting of mercuric oxide, manganese dioxide, zinc, cadmium, iron, indium, magnesium, aluminum and lead, (2) water-soluble resin binder material and (3) an amount of compatible hydrophilic plasticizer sufficient to impart flexibility to the finished plate;
   b. securing the paste to an electrically conductive substrate to form the electrode plate;
   c. drying the electrode plate at temperatures in the range of about 50° – 90°F. under controlled humidity conditions to prepare said pasted flexible electrode plate in a finished state without further treatment.

2. The method of claim 1 wherein the active material comprises zinc and the paste mixture further comprises a reducible zinc-active material as a charge reserve and a mercuric compound as a corrosion inhibitor.

3. The method of claim 1 wherein the humidity is maintained in the range of 30 to 70 percent.

4. The method of claim 1 wherein the humidity is maintained in the range of 40 to 60 percent.

5. A flexible electrode plate for use as an anode of a rechargeable alkaline galvanic cell comprising:
   a. an electrically conductive substrate;
   b. a paste formulation secured to the substrate comprising:
   electrochemically active zinc; water-soluble resinous binder in an amount from about 0.1 to about 5 weight percent of the plate;
   hydrophilic polyethylene glycol plasticizer having an average molecular weight of from about 4,000 to about 20,000, said plasticizer being compatible with the binder and active material and present in an amount between about 5 to about 50 weight percent based on the binder and in any event present in sufficient amount to impart substantialy flexibility to said flexible electrode plate.

6. The electrode plate of claim 5 wherein the electrochemically active material is zinc and the binder is selected from the group consisting of polyvinyl alcohol, polyacrylamide and cellulose derivatives.

7. The flexible electrode plate of claim 5 wherein said water-soluble resinous binder is methyl cellulose.

8. The flexible electrode plate of claim 7 wherein said polyethylene glycol plasticizer has an average molecular weight of about 20,000.

9. A flexible zinc electrode plate for use as the anode of a rechargeable alkaline galvanic cell and capable of being wound without deleterious effect about a ¼ inch diameter mandrel, said plate comprising an electrically conductive substrate; a paste formulation secured to the substrate comprising electrochemically active particulate zinc material, water soluble resinous binder in an amount from about 0.1 to about 5 weight percent of the plate, and a minor amount but in any event at least 1 weight percent based on the weight of the binder of a hydrophilic plasticizer of polyethylene glycol having an average molecular weight of from about 4,000 to about 20,000.

10. A flexible electrode plate for use as the anode of a rechargeable alkaline galvanic cell comprising:
   a. an electrically conductive substrate;
   b. a paste formulation secured to the substrate comprising:
   electrochemically active cadmium;
   water-soluble resinous binder in an amount from about 0.1 to about 5 weight percent of the plate;
   hydrophilic polyethylene glycol plasticizer having an average molecular weight of from about 4,000 to about 20,000, said plasticizer being compatible with the binder and active material and present in an amount between about 5 to about 50 weight percent based on the binder and in any event present in sufficient amount to impart substantial flexibility to said flexible electrode plate.

* * * * *